United States Patent

Bruce

[11] Patent Number: 6,119,321
[45] Date of Patent: Sep. 19, 2000

[54] METHOD OF MAKING AN EARTH TILLING SWEEP FROM DISC SCRAP

[76] Inventor: Douglas G. Bruce, 2223 Fourth St., Perry, Iowa 50220

[21] Appl. No.: 09/378,951

[22] Filed: Aug. 23, 1999

[51] Int. Cl.⁷ .............................. B21H 7/06; B21K 19/02
[52] U.S. Cl. .................................. 29/14; 29/417; 76/113; 76/104.1; 172/730; 172/765
[58] Field of Search ............................. 29/412, 417, 558, 29/14; 72/379.2, 338; 76/113, 104.1; 172/721, 730, 732, 733, 765

[56] References Cited

U.S. PATENT DOCUMENTS

| | | | |
|---|---|---|---|
| 1,639,593 | 8/1927 | Dean | 29/14 |
| 1,648,843 | 11/1927 | Francis | 172/730 |
| 2,226,884 | 12/1940 | Wiese | 29/14 |
| 5,259,461 | 11/1993 | Cochrane | 172/730 |
| 5,752,407 | 5/1998 | Becker et al. | 29/14 |

*Primary Examiner*—David P. Bryant
*Assistant Examiner*—Jermie E. Cozart
*Attorney, Agent, or Firm*—Henderson & Sturm LLP

[57] ABSTRACT

A method of making earth tilling sweeps from disc scrap including a process of cutting a plurality of circular discs side-by-side to form disc cut-outs as well as discs. Each cut-out is formed around an axis which is perpendicular to the plane of the sheet of metal from which the discs are cut. The method herein includes leaving a predetermined width of material between the disc cut-outs and a predetermined width of metal between each respective disc cut-outs on at least one of the side edges. A sweep blank is made by cutting between and through the width of metal between the cut-outs and between the one edge and each one of two adjacent cut-outs. Further cutting of the sweep blank toward its final configuration includes forming attachment openings therein. The sweep blank is then bent into a three-dimensional shape for use in tilling the earth.

5 Claims, 3 Drawing Sheets

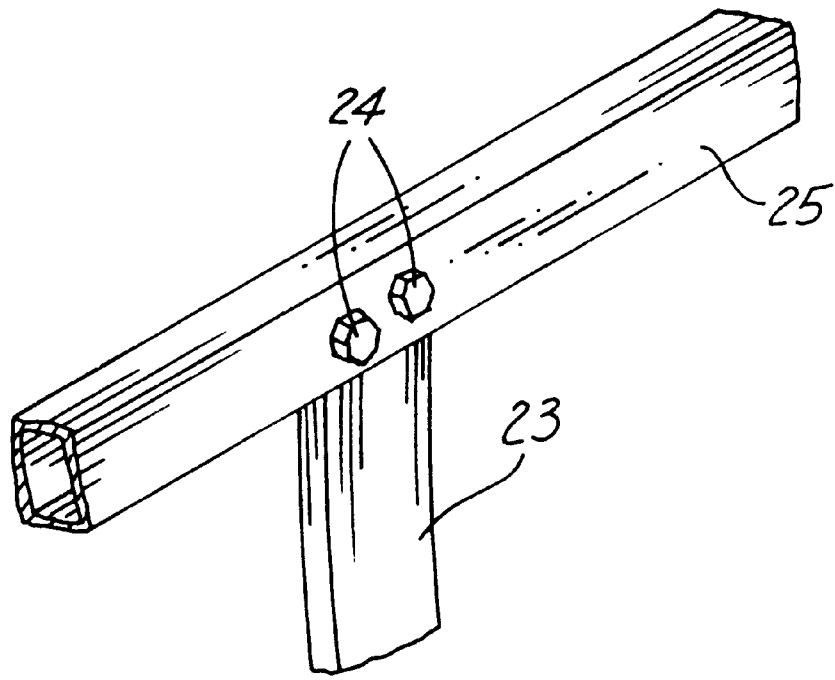
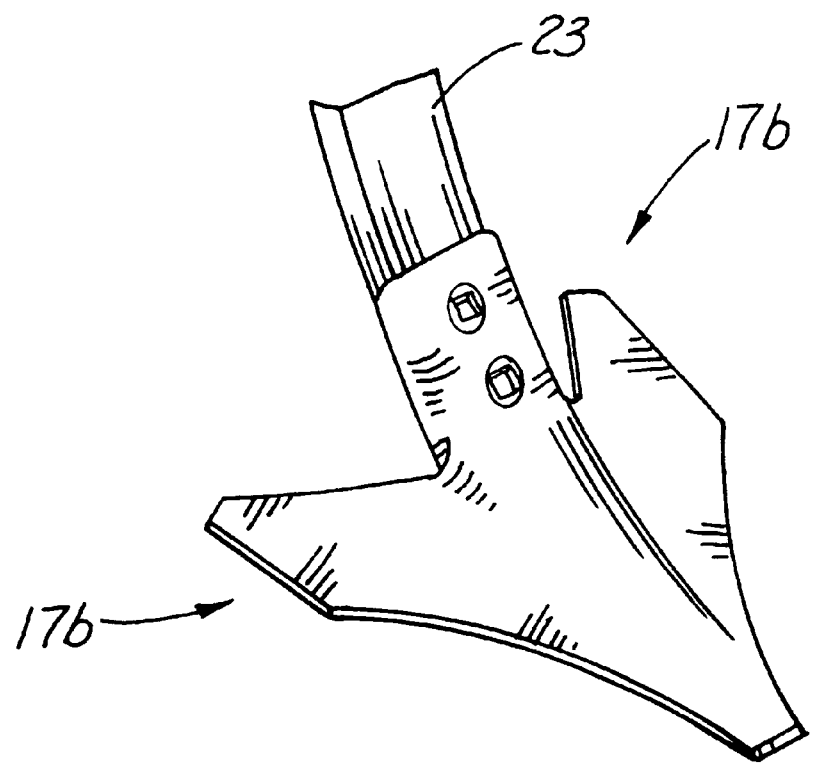
Fig. 4

METHOD OF MAKING AN EARTH TILLING SWEEP FROM DISC SCRAP

CROSS-REFERENCE TO RELATED APPLICATIONS

Not applicable.

STATEMENT REGARDING FEDERALLY SPONSORED RESEARCH OR DEVELOPMENT

Not applicable.

MICROFICHE APPENDIX

Not applicable.

BACKGROUND OF INVENTION

1. Field of the Invention

The present invention relates to the manufacture of earth tillage sweeps or cultivators or the like and more particularly to a method of making such sweeps from scrap leftover from making agricultural tillage discs or the like.

2. Description of Prior Art

Making sweeps from a pattern and stamping or cutting out the complete outline of the blanks creates considerable scrap metal and often this scrap metal is merely thrown away. After the flat blank is cut, it is formed into a three-dimensional shape during the process of manufacture.

Similarly, in the making of earth tillage discs such as those used in the agricultural field, the discs are cut or stamped out of a sheet of metal, typically from a rectangular piece of metal and then the scrap is discarded.

Consequently, there is a need for a way to utilize more of the scrap metal in the process of making discs and sweeps to reduce the wastefulness present in current manufacturing methods.

BRIEF SUMMARY OF THE INVENTION

The present invention relates to a method of making earth tilling sweeps from disc scrap including the process of cutting a plurality of circular discs side-by-side to form disc cut-outs as well as discs. Each cut-out is formed around an axis which is perpendicular to the plane of the sheet of metal from which the discs are cut. The sheet has a longitudinal axis. The method herein includes leaving a predetermined width of material between the disc cut-outs and a predetermined width of metal between each respective disc cut-outs on at least one of the side edges. A sweep blank is made by cutting between and through the width of metal between the cut-outs and between the one edge and each one of two adjacent cut-outs. Further cutting of the sweep blank toward its final configuration includes forming attachment openings therein. The sweep blank is then bent into a three-dimensional shape for use in tilling the soil.

An object of the present invention is to provide an improved method for making sweeps from the scrap of making discs to thereby reduce the amount of waste.

Another object of the present invention is to use the circular cut made in discs as part of the outline for a sweep blank to reduce the scrap metal generated in these processes.

A still further object of the invention is to utilize some of the cutting that has already been done in the process of making a disc and saving most of the scrap left over from such disc making by turning it into a useful product such as a sweep.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 4 is a perspective partial view of the final sweep attached to a shank and to a cultivator frame for tilling the soil.

DETAILED DESCRIPTION OF THE INVENTION

Figure 1:
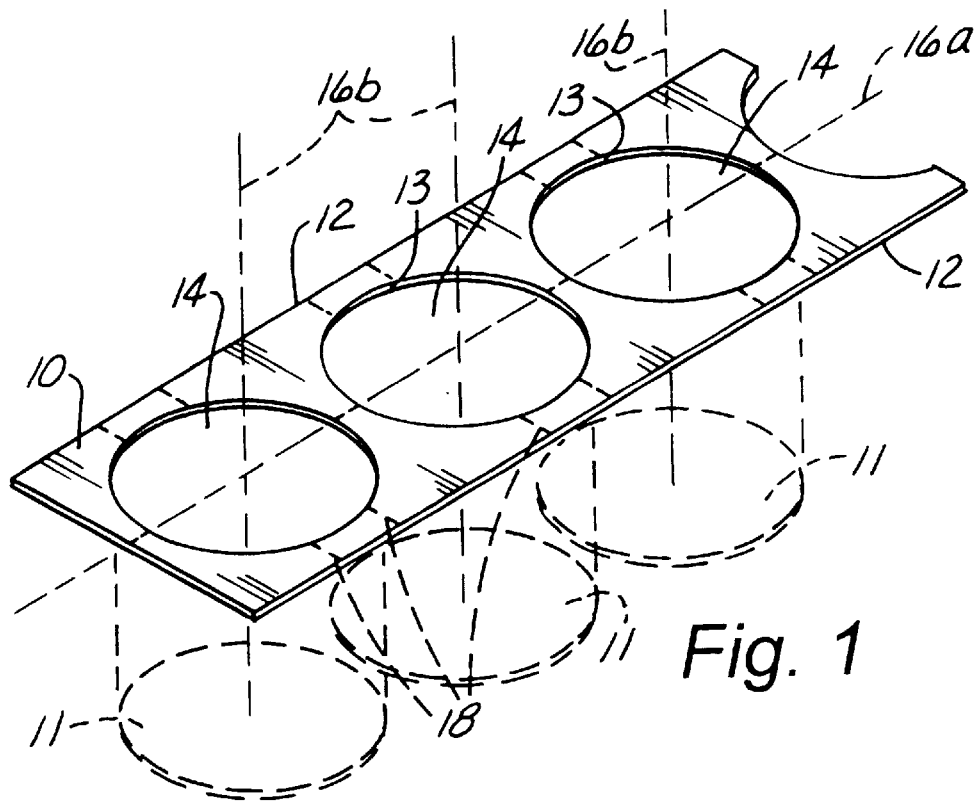
FIG. 1 shows a sheet of metal in solid lines which have discs in dashed lines cut therefrom.

Referring now to the drawings wherein like reference numerals designate identical or corresponding parts throughout the several views, FIG. 1 shows a sheet of material (10) from which a plurality of discs (11) have been cut. These discs (11) can be used for tillage equipment as is common in the agricultural field. Typically a slightly smaller sheet of metal (10) would be used to reduce the amount of scrap produced, but the present invention relates to leaving slightly more material between the side edges (12) and the edge (13) closest to the side edges for reasons which will be explained below. Cut-out portions (14) are substantially the same shape as the discs (11), which is circular.

Figure 2:
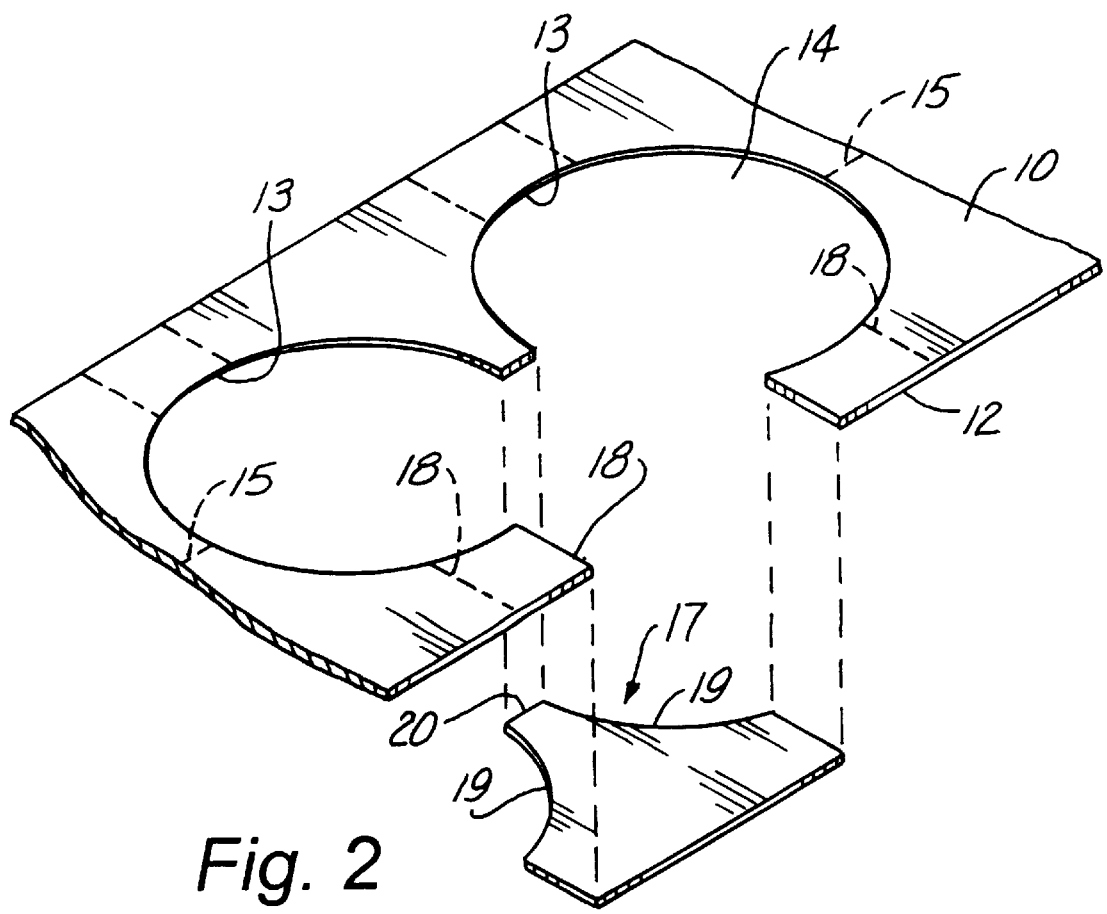
FIG. 2 shows a portion of the sheet of metal of FIG. 2 showing how a blank for a tilling sweep is cut from the scrap from the disc making process.

Referring now to FIG. 2, it is noted that by cutting along cuts (15), which are along a line (16a) which passes through the top of the plane of the sheet (10) and through the axes (16b) about which the discs (10) and cut-outs (14) are formed, a portion of a sweep blank (17) is formed. Further cuts are made along lines (18) as can readily be seen in FIG. 2. By making the sheet (10) have a little more distance between the outer edges (13) of the cut-outs (14) and the side edges (12), there is enough material available to make the sweep blank (17) so that the arcuate portions (19) of the blank (17) do not need to be cut to a different curvature but can utilize the circular curvature already present in the blank (17). Previously these metal pieces around where the discs (11) are cut out are just scrapped rather than resulting in a useful piece of metal which needs less cutting to form it than it would if made from scratch from a sheet like the metal sheet (10) of FIG. 1.

It is apparent, therefore, that by moving the disc cut-outs (14) apart slightly (which increased the amount of metal left behind) to allow more space along the line (15) and determine the width of point (20) of the blank (17), and allowing more material to be left over on the side edges (12), it is possible to make the blank (17) from what otherwise would be scrap from the disc making process shown in FIG. 1. This utilizes some of the cutting that has already been done in the disc making process of FIG. 1 and saves most of the scrap left over from disc making by turning it into a useful product such as the sweep blank (17).

Figure 3:
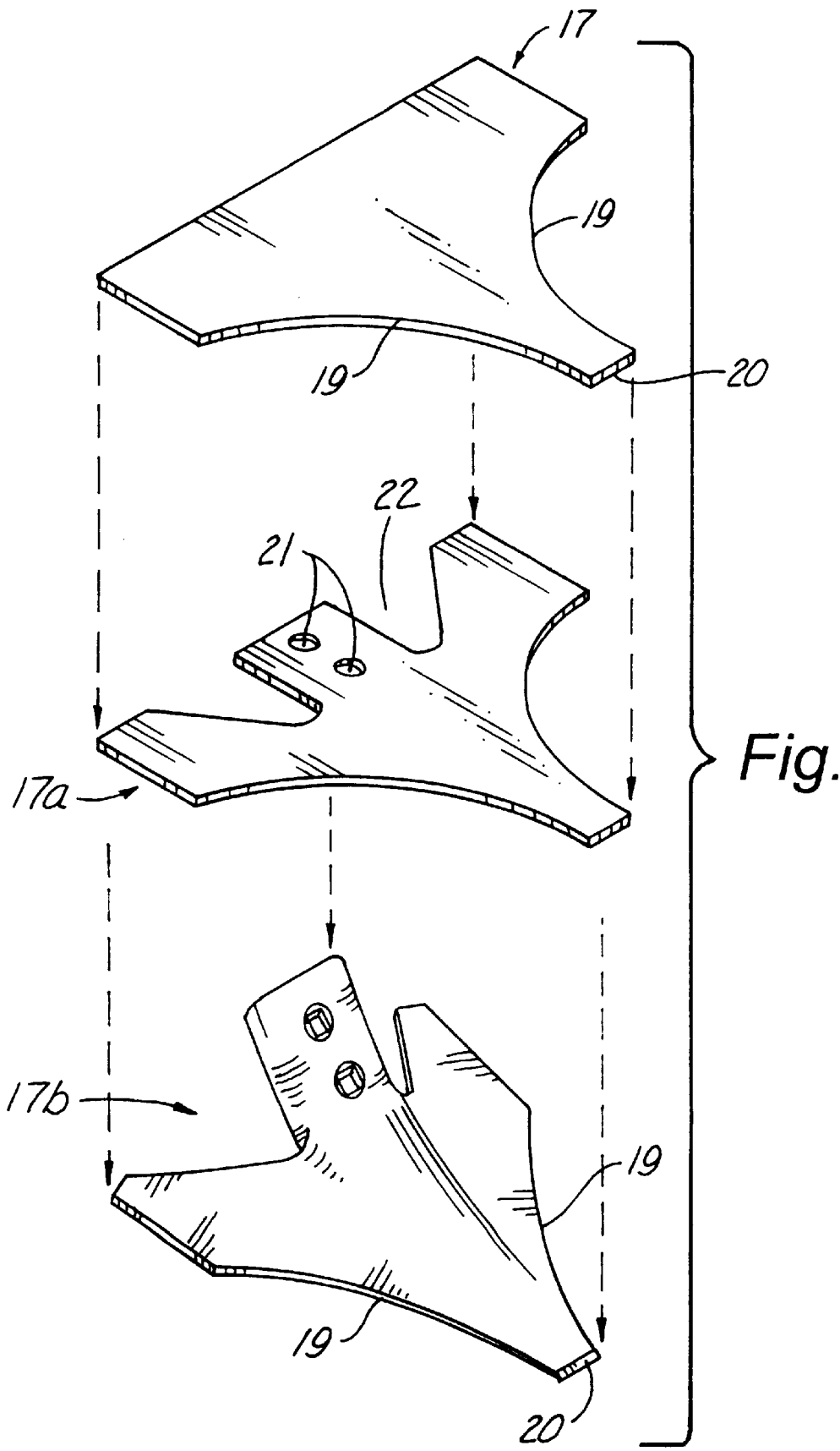
FIG. 3 further shows how the disc blank of FIG. 2 is step-by-step formed into an earth tilling sweep.

Referring now to FIG. 3, it is noted that the sweep blank (17) needs to be cut further during the process of making a sweep to the shape (17a), which is done essentially by cutting holes (21) and V-shaped portions (22) out of the blank (17).

The next step is to form the sweep (17*b*) from the blank (17*a*) by bending it and forging it into a three-dimensional sweep as is similar to sweeps used for tilling the earth such as for cultivating row crops. The final product (17*b*) can be heat-treated at any appropriate step during the process and can be sharpened at the point (20) if desired. It can also be sharpened along arcuate portions (19) if desired, but such is certainly not necessary.

To utilize the sweep (17*b*), it can be bolted to a shank (23), which can be made of spring steel, if desired, and this shank (23) can be attached by bolts (24) or otherwise attached to a frame (25) of an earth tilling piece of equipment such as a row crop cultivator or the like.

Accordingly, it will be appreciated that the method shown herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A method of making an earth tilling sweep from disc scrap comprising:

cutting a plurality of circular discs side by side to form disc cut-out, each cut-out being disposed respectively about an axis substantially perpendicular to the plane of a sheet of metal from which said discs are cut, said sheet having a longitudinal axis extending through each cut-out, and side edges, said method further including leaving a predetermined width of metal between said adjacent disc cut-outs and a predetermined width of metal between each respective disc cut out on at least one of said side edges;

forming a sweep blank by cutting between and through said width of metal between cut-outs and between said at least one edge and each one of two adjacent cut-outs;

further cutting said sweep blank towards its final configuration including forming attachment openings therein; and bending said sweep blank to form an earth tilling sweep.

2. The method of claim 1 wherein said cutting between said width of metal between cut-outs is made along a line substantially extending through or parallel to said perpendicular axes.

3. The method of claim 1 including attaching said earth tilling sweep to a shank and operatively attaching said shank to an earth tilling piece of equipment.

4. The method of claim 1 wherein a forward-most portion of said sweep is sharpened where it was cut at said predetermined width between said adjacent disc cut-outs.

5. The method of claim 1 wherein a portion of the outside periphery of said sweep from said forward most portion to rear portion thereof includes a portion thereof with substantially the same radius of curvature as the radius of curvature of said disc cut-outs, whereby no further changing of the radius of curvature is necessary in the formation of that portion of said sweep.

* * * * *